US011336148B2

(12) United States Patent
Mills et al.

(10) Patent No.: US 11,336,148 B2
(45) Date of Patent: May 17, 2022

(54) PULLEY ASSISTED ELECTROMAGNETIC FLUID PUMP

(71) Applicant: Hanon Systems EFP Canada Ltd., Concord (CA)

(72) Inventors: Kyle D. Mills, Etobicoke (CA); Darrell F. Greene, Bradford (CA)

(73) Assignee: HANON SYSTEMS EFP CANADA LTD., Concord (CA)

( * ) Notice: Subject to any disclaimer, the term of this patent is extended or adjusted under 35 U.S.C. 154(b) by 306 days.

(21) Appl. No.: 16/823,726

(22) Filed: Mar. 19, 2020

(65) Prior Publication Data

US 2020/0321828 A1    Oct. 8, 2020

Related U.S. Application Data

(60) Provisional application No. 62/828,018, filed on Apr. 2, 2019.

(51) Int. Cl.
| | |
|---|---|
| *H02K 7/10* | (2006.01) |
| *F04B 49/06* | (2006.01) |
| *F04B 17/03* | (2006.01) |
| *F04D 13/06* | (2006.01) |

(52) U.S. Cl.
CPC .......... *H02K 7/1012* (2013.01); *F04B 17/03* (2013.01); *F04B 49/06* (2013.01); *F04D 13/06* (2013.01); *H02K 7/10* (2013.01)

(58) Field of Classification Search
CPC ........ H02K 7/1012; H02K 7/10; H02K 7/108; H02K 7/1085; H02K 7/11; H02K 7/112; H02K 7/1125; H02K 7/114; F04B 17/03; F04B 49/06; F04B 35/04; F04B 49/20; F04B 53/16; F04D 13/06

USPC .......................................................... 310/78
See application file for complete search history.

(56) References Cited

U.S. PATENT DOCUMENTS

| | | | |
|---|---|---|---|
| 5,823,282 A | 10/1998 | Yamaguchi | |
| 2002/0014804 A1 | 2/2002 | Nelson et al. | |
| 2008/0318729 A1* | 12/2008 | Asao | B60K 6/485 |
| | | | 477/5 |

(Continued)

FOREIGN PATENT DOCUMENTS

KR     20120027797 A     3/2012

OTHER PUBLICATIONS

International Search Report regarding International Application No. PCT/IB2020/052992 dated Jul. 7, 2020.

*Primary Examiner* — Ahmed Elnakib

(57) ABSTRACT

An electrically and mechanically driven automotive accessory including a housing, an electric motor, a pulley, and a pulley assist mechanism. The electric motor comprises a stator assembly that is mounted to the housing and a rotor assembly that is mounted to a shaft. The electric motor creates a primary torque flow path that drives rotation of the rotor assembly relative to the stator assembly. The pulley is rotatable relative to the shaft and the rotor assembly. The pulley assist mechanism includes an annular channel in the rotor assembly that creates a magnetic gap, a finger made of a non-ferrous metal that extends from the pulley into the annular channel, and an electromagnetic coil that induces eddy currents in the finger of the pulley and a magnetic field in the magnetic gap, which creates a secondary torque flow path between the pulley and the rotor assembly.

20 Claims, 7 Drawing Sheets

(56) References Cited

U.S. PATENT DOCUMENTS

| | | | |
|---|---|---|---|
| 2010/0122882 A1* | 5/2010 | Komorowski | F16D 27/105 |
| | | | 192/103 C |
| 2014/0023526 A1* | 1/2014 | Roby | F04D 29/18 |
| | | | 417/223 |
| 2014/0174874 A1* | 6/2014 | Qin | F16D 27/112 |
| | | | 192/66.32 |
| 2018/0179923 A1* | 6/2018 | Shepherd | F01M 1/02 |
| 2020/0321828 A1* | 10/2020 | Mills | H02K 7/10 |
| 2021/0017996 A1* | 1/2021 | Mills | F16H 55/36 |
| 2021/0079830 A1* | 3/2021 | Mills | F04D 13/064 |
| 2021/0310491 A1* | 10/2021 | McCarroll | F04D 29/007 |

\* cited by examiner

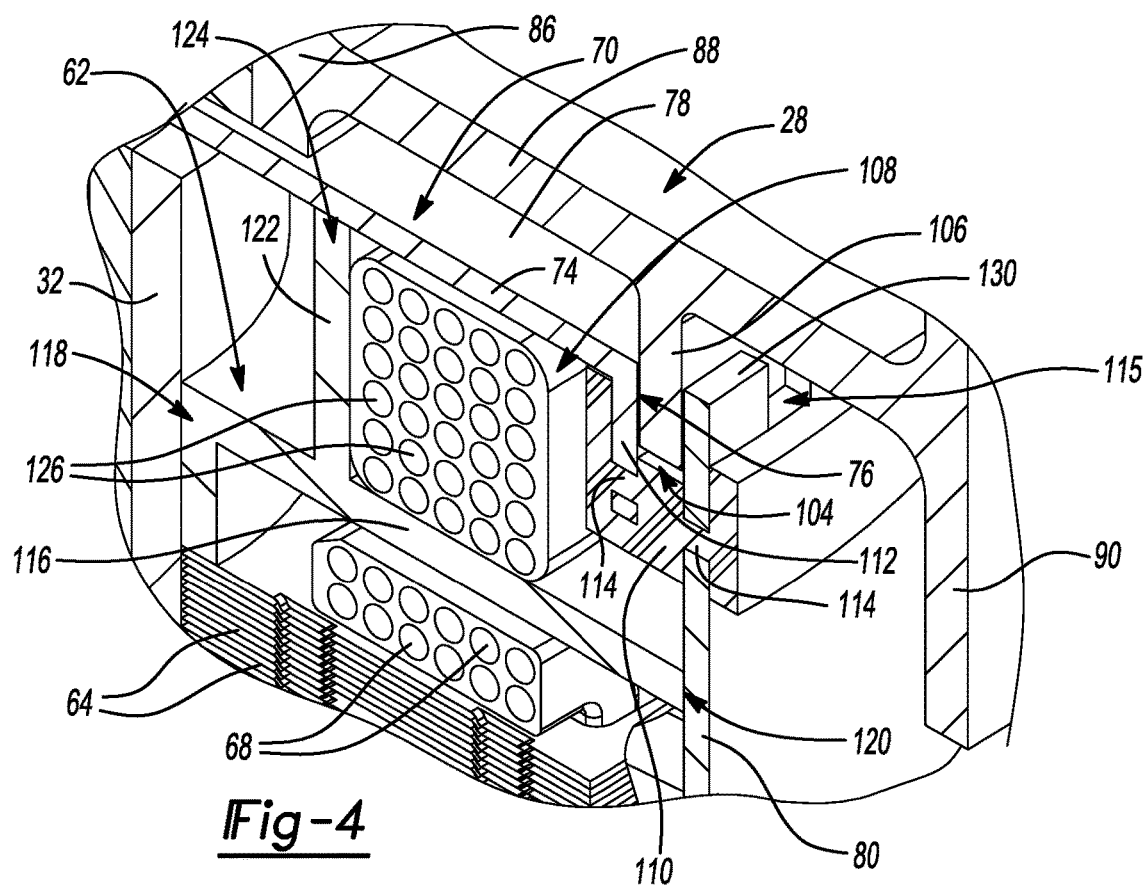
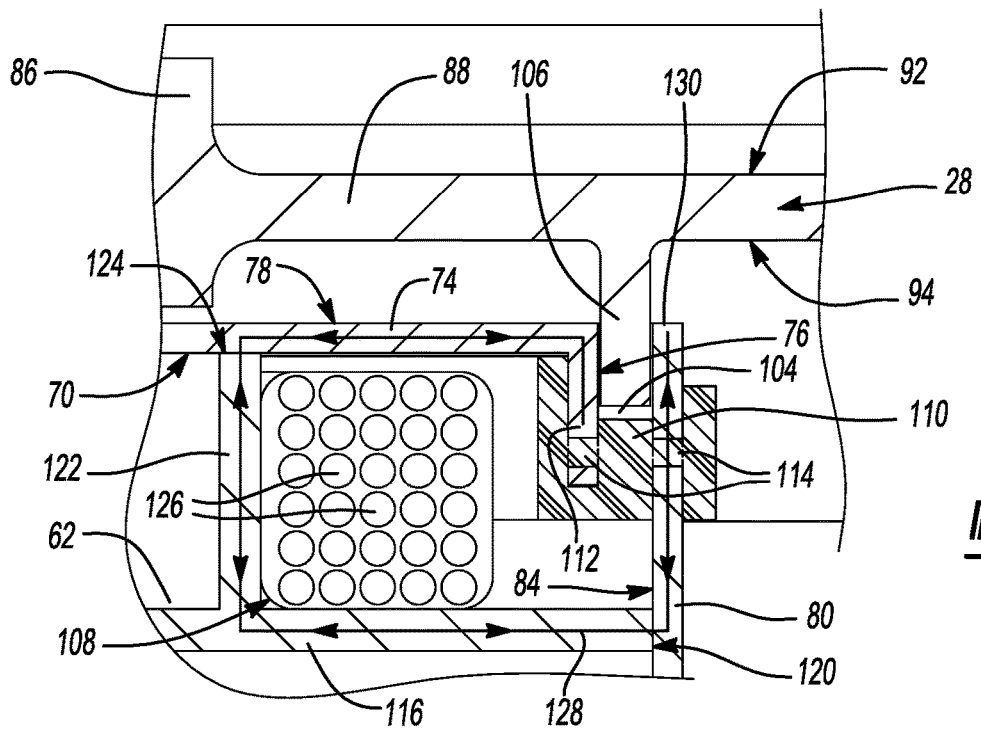

PULLEY ASSISTED ELECTROMAGNETIC FLUID PUMP

CROSS-REFERENCE TO RELATED APPLICATIONS

This application claims the benefit of U.S. Provisional Application No. 62/828,018, filed on Apr. 2, 2019. The entire disclosure of the application identified above is incorporated herein by reference.

FIELD

The subject disclosure is generally directed to electrically and mechanically driven automotive accessories, including without limitation, electrically and mechanically driven automotive pumps. The subject disclosure is also directed to methods of operating the same.

BACKGROUND

This section provides background information related to the present disclosure which is not necessarily prior art.

Automobiles typically include a variety of different automotive accessories that are either driven by electric motors or driven mechanically off of the engine, and more particularly, off of an accessory belt that is driven by the crankshaft of the engine. Examples include pumps for pumping coolant, oil, transmission fluid, and fuel. Further examples include pumps for pumping engine intake air, which are sometimes referred to as compressors. Mechanically driven automotive accessories suffer from several disadvantages, chief among them being that they cannot be driven when the engine is not running. In addition, the rotational speed and thus the output of mechanically driven automotive accessories is dependent upon engine speed. Therefore, the speed and output of typical mechanically driven automotive accessories cannot be controlled independently of the engine speed.

Electrically driven automotive accessories solve the problems associated with typical mechanically driven automotive accessories, but carry with them their own disadvantages. Most automotive electrical systems generate and run on 12 volts (V) direct current (DC). There are practical limits on the power of electric motors that can be run off of 12 volts (V) direct current (DC) because once a certain power level is exceeded, the heat generated by the electric motor becomes difficult to manage and can cause the electronics to overheat. This makes it difficult to provide an electrically powered automotive accessory capable of delivering an output of 1 kilowatt (kW) while still utilizing a power supply that runs off 12 volts (V) direct current (DC). Accordingly, automobile manufacturers must settle for less powerful electrically driven automotive accessories if they want an automobile accessory that can be driven independently of engine speed and when the engine is not running.

SUMMARY

This section provides a general summary of the disclosure, and is not a comprehensive disclosure of its full scope or all of its features.

In accordance with one aspect of the present disclosure, an electrically and mechanically driven automotive accessory is provided. The electrically and mechanically driven automotive accessory includes a housing, an electric motor configured to rotationally drive a shaft, and a pulley that is rotatable relative to both the electric motor and the shaft. The shaft is rotatably supported in the housing and extends along a longitudinal axis between an input end and an output end. The electric motor comprises a stator assembly and a rotor assembly. When the electric motor is activated, the electric motor creates a primary torque flow path that drives rotation of the rotor assembly relative to the stator assembly. The stator assembly is fixedly mounted to the housing. The rotor assembly is fixedly mounted to the shaft such that the rotor assembly rotates with the shaft. The pulley is rotatably supported on the input end of the shaft such that the pulley is rotatable relative to the shaft and the rotor assembly. The electrically and mechanically driven automotive accessory has a pulley assist mechanism. The pulley assist mechanism includes an annular channel in the rotor assembly that creates a magnetic gap, a finger made of a non-ferrous metal material that extends from the pulley into the annular channel, and an electromagnetic coil that is configured to induce eddy currents in the finger of the pulley and a magnetic field in the magnetic gap created by the annular channel. When the electromagnetic coil is activated, a magnetic coupling is formed between the finger of the pulley and the rotor assembly due to the eddy currents induced in the finger of the pulley. This magnetic coupling creates a secondary torque flow path between the pulley and the rotor assembly.

In accordance with another aspect of the present disclosure, the rotor assembly includes a plurality of notches that are positioned circumferentially about the annular channel. In other words, the annular channel is bounded on at least one side by the circumferentially spaced notches in the rotor assembly. The notches create interruptions in the magnetic flux such that the finger experiences a changing (i.e., fluctuating) magnetic field as it rotates relative to the rotor assembly. This fluctuating magnetic field produces the eddy currents that create the secondary torque flow path between the pulley and the rotor assembly when the electromagnetic coil is activated (i.e., energized).

In accordance with another aspect of the present disclosure, a method of operating the electrically and mechanically driven automotive accessory described above is provided. The method includes the step of applying electricity to electrical windings of the stator assembly to generate an electromagnetic field and a primary torque flow path that rotationally drives the rotor assembly and the shaft. The method also includes the step of rotationally driving the pulley, which is rotatably supported on a pulley bearing assembly. The method proceeds with the steps of detecting a first rotational speed of the rotor assembly or the shaft and detecting a second rotational speed of the pulley. The method further comprises the step of activating the pulley assist mechanism when the second rotational speed is greater than the first rotational speed. The step of activating the pulley assist mechanism includes applying electricity to the electromagnetic coil of the pulley assist mechanism to induce a magnetic field in the annular channel in the rotor assembly and eddy currents in the finger of the pulley to create a secondary torque flow path between the pulley and the rotor assembly.

The secondary torque flow path provided by the pulley assist mechanism adds to the primary torque flow path produced by the electric motor, which allows the rotor assembly to be driven at a higher rotational speed than would otherwise be possible by utilizing only the primary torque flow path. As a result, the electrically and mechanically driven automotive accessory described herein can generate 1 kilowatt (kW) of pumping power utilizing an electric motor that runs off of 12 volts (V) direct current (DC). Additionally, the electric current supplied to the electrical windings of the stator assembly can be reduced for any given rotational speed when the electromagnetic coil of the pulley assist mechanism is activated. This means that higher rotational speeds and power output are possible while retaining an electric motor that runs on a 12 volt power supply without overheating. The pulley assist mechanism also allows the electric motor to be downsized because peak demand usually coincides with high engine speeds, where the rotational speed of the pulley is high and the pulley assist mechanism is most effective (i.e., when the pulley assist mechanism can provide the largest increase in rotational speed to the rotor assembly).

Unlike mechanically driven automotive accessories, the electrically and mechanically driven automotive accessory described herein can be driven by just the electric motor when the engine of the vehicle is not running. Additionally, the rotational speed of the shaft is fully variable and can be controlled independently of the speed of the engine. The electric current applied to the electromagnetic coil of the pulley assist mechanism can be controlled to vary the degree of magnetic coupling between the finger of the pulley and the rotor assembly. As a result, the amount of torque transfer between the finger of the pulley and the rotor assembly through the secondary torque flow path can be adjusted to control the rotational speed of the shaft as well as the amount of mechanical drag the pulley places on the engine of the vehicle.

BRIEF DESCRIPTION OF THE DRAWINGS

Other advantages of the present disclosure will be readily appreciated, as the same becomes better understood by reference to the following detailed description when considered in connection with the accompanying drawings wherein:

FIG. 4 is an enlarged, partial side section view of the electrically and mechanically driven automotive accessory illustrated in FIG. 3;

FIG. 5 is a partial side cross-section view of the electrically and mechanically driven automotive accessory illustrated in FIG. 1;

DETAILED DESCRIPTION

Figure 1:
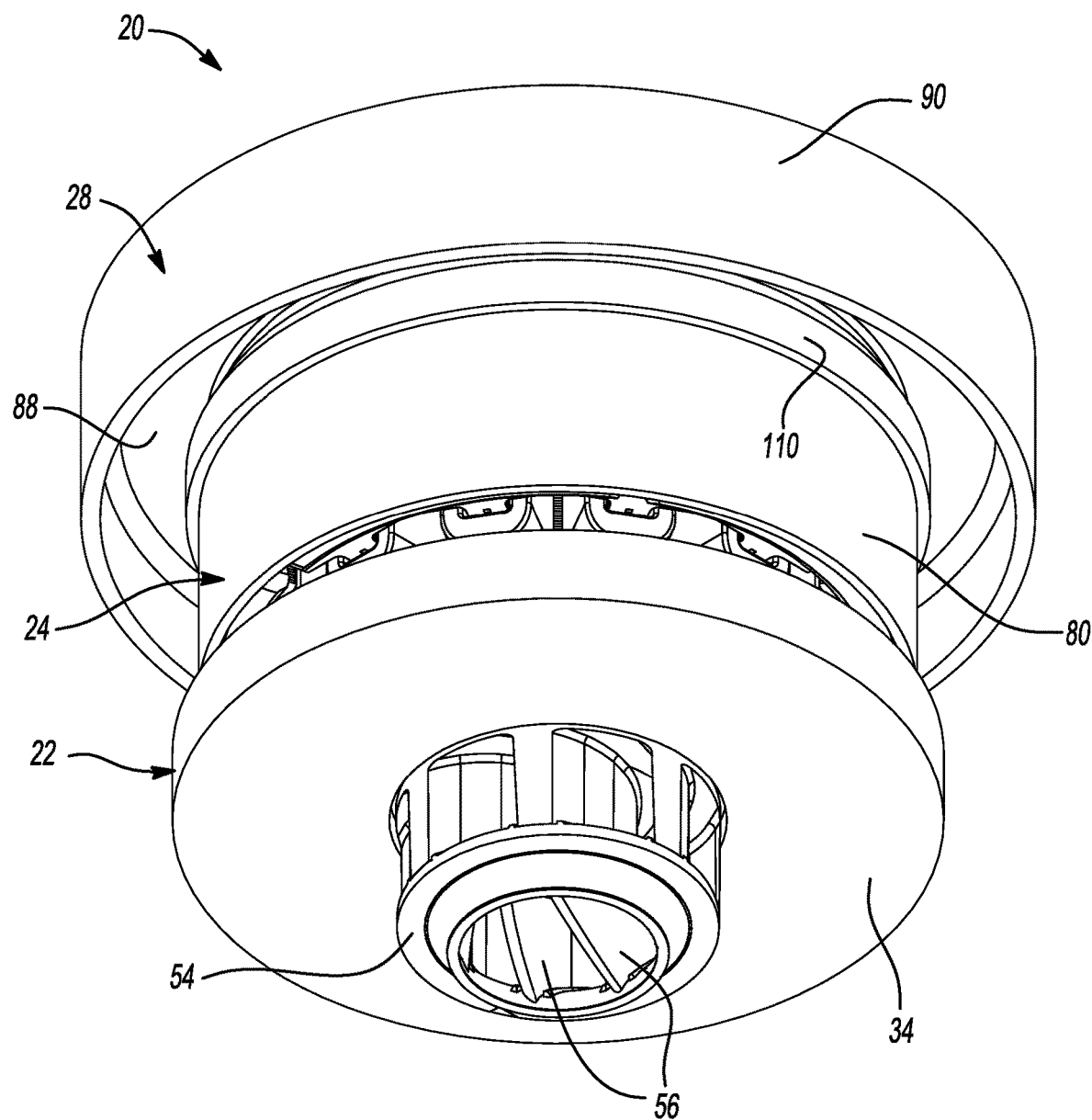
FIG. 1 is a side perspective view of an electrically and mechanically driven automotive accessory that has been constructed in accordance with the teachings of the present disclosure.

Referring to the Figures, wherein like numerals indicate corresponding parts throughout the several views, an electrically and mechanically driven automotive accessory 20 is disclosed.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIGS. is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
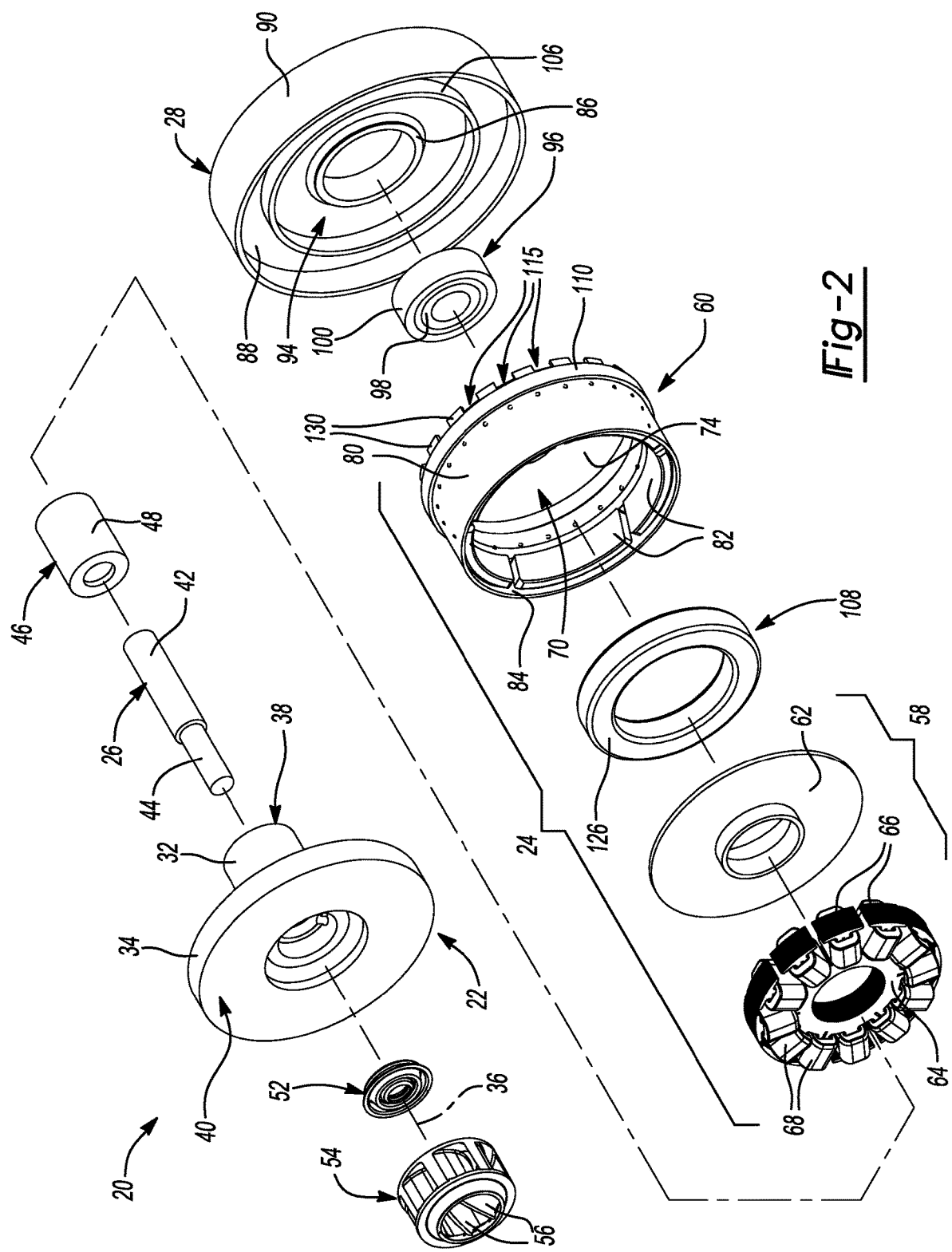
FIG. 2 is an exploded perspective view of the electrically and mechanically driven automotive accessory illustrated in FIG. 1.
Figure 3:
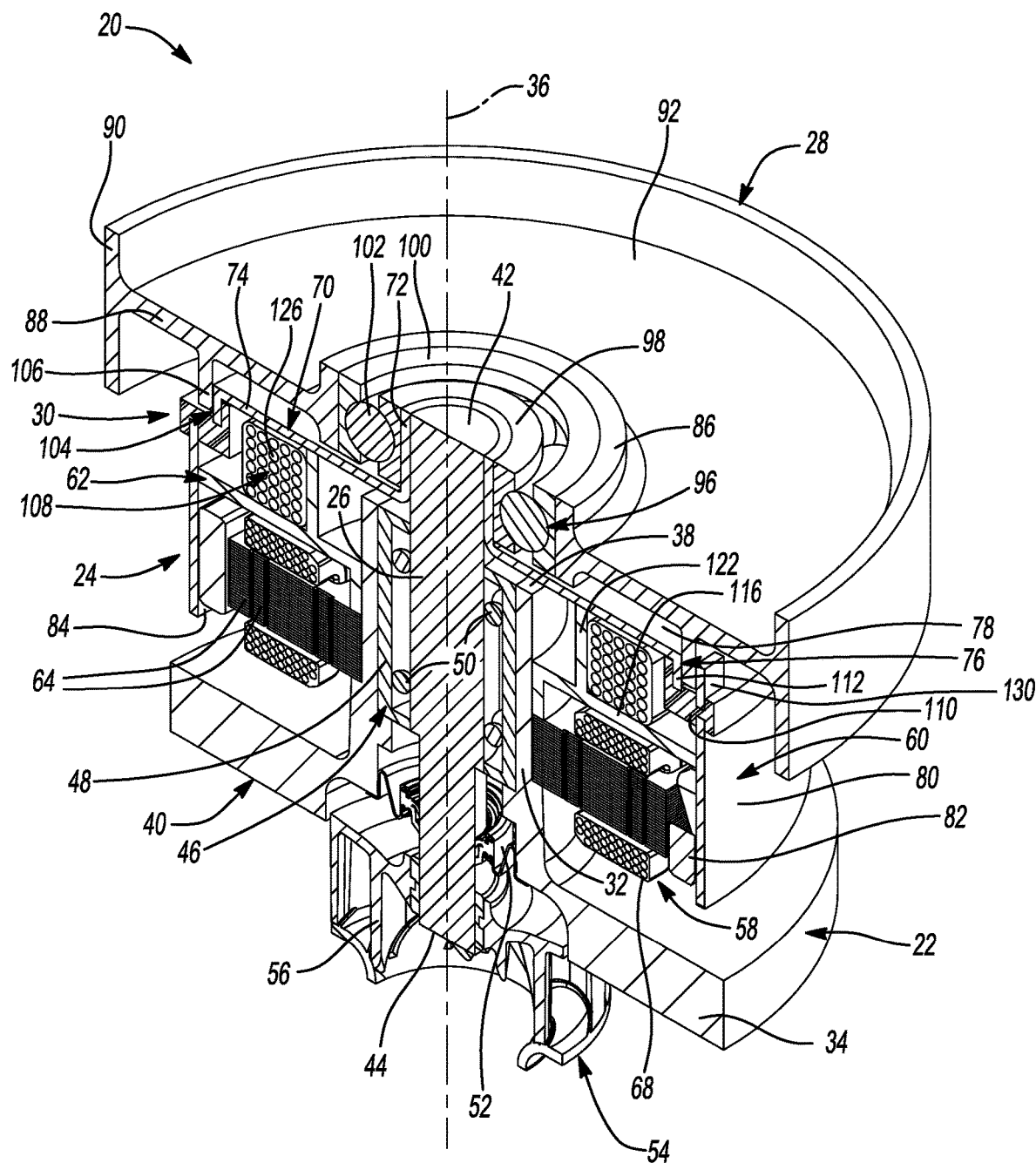
FIG. 3 is a side section view of the electrically and mechanically driven automotive accessory illustrated in FIG. 1.

With reference to FIGS. 1-3, the electrically and mechanically driven automotive accessory 20 disclosed herein includes a housing 22, an electric motor 24 configured to rotationally drive a shaft 26, and a pulley 28 that is rotatable relative to both the electric motor 24 and the shaft 26. The pulley 28 is configured to be rotationally driven by a belt (not shown), such as a rubber accessory belt, a gear/gearset, or a shaft that is driven by an engine (not shown). The engine may be, without limitation, an internal combustion engine powering a vehicle (not shown). As will be explained in greater detail below, the electrically and mechanically driven automotive accessory 20 includes a pulley assist mechanism 30 that utilizes electromagnetism to transfer torque from the pulley 28 to parts of the electric motor 24 to provide a torque assist (i.e., a mechanical boost) to the electric motor 24 under certain operating conditions.

Although other configurations are possible, in the illustrated embodiment the housing 22 includes a tubular portion 32 and a flange portion 34. The tubular portion 32 extends annularly about the longitudinal axis 36 between a first housing end 38 and a second housing end 40. The flange portion 34 extends radially outwardly from the tubular portion 32 at the second housing end 40. The shaft 26 of the electrically and mechanically driven automotive accessory 20 is received in the tubular portion 32 of the housing 22. The shaft 26 extends along a longitudinal axis 36 between an input end 42 and an output end 44. It should therefore be appreciated that the term "longitudinal" used herein describes structures that are parallel/co-axial to the longitudinal axis 36. The shaft 26 is longer than the tubular portion 32 of the housing 22 such that the input end 42 of the shaft 26 extends out from the first housing end 38 and the output end 44 of the shaft 26 extends out from the second housing end 40. The shaft 26 is rotatably supported in the tubular portion 32 of the housing 22 by a shaft bearing assembly 46. Although other configurations are possible, the shaft bearing assembly 46 may have an integrated shaft 26 bearing arrangement with an outer sleeve 48 that is press fit into the tubular portion 32 of the housing 22 and two longitudinally spaced ball bearing packs 50 that are positioned radially between the shaft 26 and the outer sleeve 48. During operation, the housing 22 may remain stationary while the shaft bearing assembly 46 allows the shaft 26 to rotate about the longitudinal axis 36 and relative to the housing 22.

Both the housing 22 and the shaft 26 may be made of a wide variety of different materials, including without limitation, various metals. In the illustrated embodiment, the shaft 26 is stepped where the shaft 26 has a larger diameter at the input end 42 and a smaller diameter at the output end 44; however, it should be appreciated that other configurations are possible, including configurations where the shaft 26 has a constant diameter along its entire length. Optionally, a shaft seal 52, extending annularly about the shaft 26, may be provided adjacent to the output end 44 of the shaft 26. In the illustrated example, the shaft seal 52 is made of a resilient material and is positioned radially between the shaft 26 and the housing 22. The shaft seal 52 in this example is fixed to the housing 22 such that the shaft 26 rotates relative to the shaft seal 52; however, in an alternative embodiment, the shaft seal 52 may be fixed to the shaft 26 such that it rotates with the shaft 26 and relative to the stationary housing 22.

In the illustrated example, the electrically and mechanically driven automotive accessory 20 is a fluid pump, such as a pump for pumping liquid. Such liquids may include, but are not limited to, water, coolant, oil, transmission fluid, or fuel. In accordance with this embodiment, the electrically and mechanically driven automotive accessory 20 includes an impeller 54 that is fixedly mounted to the output end 44 of the shaft 26. The impeller 54 includes one or more vanes 56. The impeller 54 can be made of a wide range of materials, including without limitation, injection molded plastic. During operation, the impeller 54 rotates with the shaft 26, which causes the vanes 56 of the impeller 54 to pump liquid through the fluid pump. However, it should be appreciated that the scope of the present disclosure is not limited to liquid pumps. For example, the electrically and mechanically driven automotive accessory 20 may be configured as an air pump (also known as an air compressor). In other non-limiting examples, the electrically and mechanically driven automotive accessory 20 could also be other automotive accessories that are typically driven by an electric motor 24, an accessory belt off the engine, the serpentine belt of the engine, the crankshaft of the engine, or a camshaft of the engine.

The electric motor 24 is configured to create a primary torque flow path that drives rotation of the shaft 26 when the electric motor 24 is activated. Although other configurations are possible, the electric motor 24 in the illustrated embodiment comprises a stator assembly 58 and a rotor assembly 60. The stator assembly 58 is fixedly mounted on the tubular portion 32 of the housing 22 and therefore remains stationary during operation. The electrically and mechanically driven automotive accessory 20 includes a stationary backing member 62 and the stator assembly 58 includes a plurality of stator plates 64, all of which are fixedly mounted on the tubular portion 32 of the housing 22. The stator plates 64 are stacked together and include a plurality of arms 66 that support electrical windings 68. Although other configurations are possible, in the illustrated embodiment, the stator plates 64 are made of metal and the electrical windings 68 are made of copper wire. Although other configurations are possible, the stator plates 64 and the electrical windings 68 may be encased in a resin or a plastic to protect them from corrosion/oxidation, vibration, contaminants, and impact damage and to structurally unitize the stator assembly 58.

The rotor assembly 60 is rotatable relative to the stator assembly 58 about the longitudinal axis 36. The rotor assembly 60 includes a hub 70 that is fixedly mounted to the shaft 26 such that the rotor assembly 60 rotates with the shaft 26. More specifically, in the illustrated embodiment, the hub 70 includes a cylindrical portion 72 that is press fit onto the input end 42 of the shaft 26. The hub 70 includes a flange 74 that extends radially outwardly from the cylindrical portion 72 to a perimeter edge 76. Accordingly, the hub 70 forms part of an end face 78 of the rotor assembly 60, which faces toward the pulley 28. The rotor assembly 60 also includes a rotating backing member 80 that extends circumferentially about at least a portion of the stator assembly 58. It should be appreciated that the words "stationary" and "rotating" used to describe the backing members 62, 80 of the electric motor 24 are merely used for labelling purposes and refer to the relative motion between these two components when the electric motor 24 is running.

Permanent magnets 82 are fixedly mounted to the rotating backing member 80 and are spaced radially outward of the stator plates 64. When electricity (i.e., electric current) is applied to the electrical windings 68 of the stator assembly 58, an electromagnetic field is created that interacts with the magnetic field of the permanent magnets 82, which causes the rotating backing member 80 to rotate. As will be explained below, the rotating backing member 80 is fixedly connected to the hub 70 of the rotor assembly 60 such that the electric motor 24 rotationally drives the shaft 26 when electricity is applied to the electrical windings 68 of the stator assembly 58. Although other configurations are possible, the permanent magnets 82 of the rotor assembly 60 may be made of a ferritic material or rare earth materials such as samarium cobalt (SmCo) or neodymium-iron boron (NdFeB) and may be glued to an inside surface 84 of the rotating backing member 80.

The pulley 28 is rotatably supported on the input end 42 of the shaft 26 such that the pulley 28 is rotatable relative to the shaft 26 and the rotor assembly 60. In the illustrated example, the pulley 28 has a hub portion 86, a pulley wall 88, and an annular rim 90. The pulley wall 88 extends radially outwardly from the hub portion 86 to the annular rim 90. The annular rim 90 of the pulley 28 is configured to mate with and be rotationally driven by the belt (not shown). The pulley wall 88 includes an outboard face 92 that faces away from the flange 74 of the hub 70 of the rotor assembly 60 and an inboard face 94 that faces toward the flange 74 of the hub 70 of the rotor assembly 60. The pulley 28 is supported by a pulley bearing assembly 96 that is positioned radially between the cylindrical portion 72 of the hub 70 of the rotor assembly 60 and the hub portion 86 of the pulley 28. Although other configurations are possible, in the illustrated embodiment, the pulley bearing assembly 96 includes an inner race 98 that is press fit on the cylindrical portion 72 of the hub 70 of the rotor assembly 60, an outer race 100 that is press fit into the hub portion 86 of the pulley 28, and a plurality of ball bearings 102 that are positioned radially between the inner and outer races 98, 100. As a result, the pulley 28 can rotate relative to the housing 22 and the stator assembly 58, which remain stationary, and relative to the shaft 26 and the rotor assembly 60, which can rotate independently of the pulley 28.

With additional reference to FIGS. 4 and 5, the pulley assist mechanism 30 includes an annular channel 104 in the rotor assembly 60, a finger 106 made that extends from the pulley 28 into the annular channel 104, and an electromagnetic coil 108 that is supported on the stationary backing member 62. As will be explained in greater detail below, the annular channel 104 is provided in the form of a circular groove on the end face 78 of the rotor assembly 60. The annular channel 104 provides a magnetic gap that the finger 106 of the pulley 28 occupies (i.e., sits in). The finger 106 extends longitudinally from the inboard face 94 of the pulley wall 88 and is received in the annular channel 104 in a clearance fit. The finger 106 of the pulley 28 therefore has a cylindrical shape. The finger 106 is the made of a non-magnetic metal, such as a non-ferrous metal material, which may include aluminum or copper. The electromagnetic coil 108 is configured to induce parasitic eddy currents in the finger 106 of the pulley 28, which produces a magnetic field in the magnetic gap provided by the annular channel 104. The magnetic field produced by the eddy currents in the finger 106 of the pulley 28 creates a secondary torque flow path between the pulley 28 and the rotor assembly 60 when the electromagnetic coil 108 is activated (i.e., energized). In some configurations, the entire pulley 28 may be made of a non-magnetic metal. In other configurations the finger 106 may be made of a non-magnetic metal while the hub portion 86, a pulley wall 88, and/or an annular rim 90 of the pulley 28 may be made of other materials.

The rotating backing member 80 is fixedly connected to the hub 70 by a bridge member 110 in an arrangement where the rotating backing member 80 extends annularly about and is spaced radially outward of the perimeter edge 76 of the hub 70. This creates the annular channel 104 between the inside surface 84 of the rotating backing member 80 and the perimeter edge 76 of the hub 70. In the illustrated embodiment, the perimeter edge 76 of the hub 70 has a bent lip 112 that extends longitudinally away from the pulley 28. Although other arrangements are possible, both the bent lip 112 of the hub 70 and the rotating backing member 80 are provided with a plurality of connection holes 114. The bridge member 110 is made of an injection molded plastic that extends through the connection holes 114 to form mechanical connections with the bent lip 112 of the hub 70 and the rotating backing member 80. In accordance with this preferred arrangement, the rotor assembly 60 is made by placing the hub 70 and the rotating backing member 80 in an injection mold at a predetermined spacing and then injection molding the bridge member 110 to couple the rotating backing member 80 to the hub 70 and form the annular channel 104. The rotating backing member 80 includes a plurality of notches 115 that are positioned circumferentially about the annular channel 104. In other words, the annular channel 104 is bounded on one side by the circumferentially spaced notches 115 in the rotating backing member 80. In the illustrated embodiment, the notches 115 extend completely through the rotating backing member 80; however, in an alternative arrangement, the notches 115 may be provided on only the inside surface 84 of the rotating backing member 84 without extending completely through the rotating backing member 80. The notches 115 create interruptions in the magnetic flux such that the finger 106 experiences a changing (i.e., fluctuating) magnetic field as it rotates relative to the rotor assembly 60. This fluctuating magnetic field produces the eddy currents that create the secondary torque flow path between the pulley 28 and the rotor assembly 60 when the electromagnetic coil 108 is activated (i.e., energized).

The hub 70 and the rotating backing member 80 are made of magnetic materials, such as ferrous metal materials like ferritic steel or iron. The bridge member 110 is made of a non-magnetic, non-metallic material, including without limitation, plastic materials such as polyphenylene sulfide (PPS). Because the bridge member 110 is made of a non-magnetic, non-metallic material, it creates the magnetic gap in the annular channel 104 (i.e., a break in the magnetic continuity of the hub 70 and the rotating backing member 80).

The stationary backing member 62 includes a first wall 116 that extends radially between a flanged inner edge 118 and an outer edge 120. The flanged inner edge 118 of the stationary backing member 62 is press fit onto the tubular portion 32 of the housing 22. The stationary backing member 62 further includes a second wall 122 that extends longitudinally from the first wall 116 to a distal end 124 positioned near the flange 74 of the hub 70 of the rotor assembly 60. Accordingly, the first wall 116 of the stationary backing member 62 is perpendicular to the longitudinal axis 36 and the second wall 122 of the stationary backing member 62 is perpendicular to the first wall 116 and parallel/co-axial to the longitudinal axis 36. The stationary backing member 62 supports the electromagnetic coil 108 of the pulley assist mechanism 30. For example, in the illustrated embodiment, the electromagnetic coil 108 is made of windings 126 of copper wire that are wound about the second wall 122 such that the electromagnetic coil 108 is positioned radially between the second wall 122 of the stationary backing member 62 and the bridge member 110 and longitudinally between the first wall 116 of the stationary backing member 62 and the flange 74 of the hub 70 of the rotor assembly 60.

The stationary backing member 62, the rotating backing member 80 of the rotor assembly 60, and the hub 70 of the rotor assembly 60 are all made of a magnetic material, such as a ferrous metal material. As best seen in FIG. 5, when electricity (i.e., electric current) is applied to the windings 126, the electromagnetic coil 108 of the pulley assist mechanism 30 induces a magnetic loop 128 in portions of the hub 70 (i.e., in the bent lip 112 and the portion of the flange 74 that extends between the bent lip 112 and the second wall 122 of the stationary backing member 62), the stationary backing member 62 (i.e., in the second wall 122 and the portion of the first wall 116 that extends between the second wall 122 and the outer edge 120 of the stationary backing member 62), and the rotating backing member 80 (i.e., in the portion of the rotating backing member 80 that extends between the annular channel 104 and the outer edge 120 of the stationary backing member 62). When the electromagnetic coil 108 of the pulley assist mechanism 30 is deactivated (i.e., de-energized), the magnetic gap created by the annular gap/bridge member 110 forms a discontinuity/break in the magnetic loop 128. As a result, there is no torque transfer between the pulley 28 and the rotor assembly 60 when the electromagnetic coil 108 is deactivated. However, when the electromagnetic coil 108 of the pulley assist mechanism 30 is activated (i.e., energized), the parasitic eddy currents that the electromagnetic coil 108 induces in the non-magnetic metal material of the finger 106 of the pulley 28 produces a magnetic field in the magnetic gap, which results in some torque transfer between the pulley 28 and the rotor assembly 60.

There are a number of predetermined tolerances (i.e., small gaps) between perimeter edge 76 of the hub 70 and the finger 106 of the pulley 28, between the inside surface 84 of the rotating backing member 80 and the finger 106 of the pulley 28, between the outer edge 120 of the stationary backing member 62 and the inside surface 84 of the rotating backing member 80, and between the distal end 124 of the second wall 122 of the stationary backing member 62 and the flange 74 of the hub 70. These tolerances must be small enough to provide a relatively uninterrupted magnetic loop 128 when the electromagnetic coil 108 is activated, but large enough to accommodate manufacturing tolerances and permit relative motion between the rotor assembly 60 and the stator assembly 58 and relative motion between the rotor assembly 60 and the pulley 28. By way of example and without limitation, these predetermined tolerances may be 100-200 microns (μm) and preferably about 150 microns (μm).

The magnetic coupling between the finger 106 of the pulley 28 and the rotor assembly 60, which is produced by the eddy currents, requires relative motion between the pulley 28 and rotor assembly 60. Accordingly, there will always be some rotational slip between the pulley 28 and the rotor assembly 60, even when the electromagnetic coil 108 is activated. The electromagnetic coil 108 of the pulley assist mechanism 30 is only activated when the belt is driving the pulley 28 at a faster rotational speed than the rotational speed that the rotor assembly 60 is being driven at via the primary torque flow path produced by the electric motor 24. When the electromagnetic coil 108 is activated in such conditions, the secondary torque flow path provided by the pulley assist mechanism 30 (i.e., the induced magnetic coupling between the finger 106 of the pulley 28 and the rotor assembly 60) adds to the primary torque flow path produced by the electric motor 24, which allows the rotor assembly 60 to be driven at a higher rotational speed (i.e., higher revolutions per minute/RPMs) than would be possible when utilizing only the primary torque flow path. As a result, the fluid flow generated by the impeller 54 is increased. Additionally, the electric current supplied to the electrical windings 68 of the stator assembly 58 can be reduced for any given rotational speed when the electromagnetic coil 108 of the pulley assist mechanism 30 is activated.

In many cases, the pulley assist mechanism 30 also allows the electric motor 24 to be downsized because peak pump demand usually coincides with high engine speeds, where the rotational speed of the pulley 28 is high and the pulley assist mechanism 30 is most effective (i.e., when the pulley assist mechanism 30 can provide the largest increase in rotational speed to the rotor assembly 60). As explained below, the electromagnetic coil 108 of the pulley assist mechanism 30 is deactivated when the primary torque flow path of the electric motor 24 is driving the rotor assembly 60 at a rotational speed that is faster than the rotational speed of the pulley 28. If the electromagnetic coil 108 were not deactivated during such conditions, the pulley assist mechanism 30 would slow the rotation of the rotor assembly 60 and act as a brake, which would be undesirable in most applications.

Unlike mechanically driven automotive accessories, the electrically and mechanically driven automotive accessory 20 described herein can be driven by just the electric motor 24 when the engine of the vehicle is not running. Additionally, the rotational speed of the shaft 26 is fully variable and can be controlled independently of the speed of the engine. The electric current applied to the windings 126 of the electromagnetic coil 108 can be controlled to vary the degree of magnetic coupling between the finger 106 of the pulley 28 and the rotor assembly 60. As a result, the amount of torque transfer between the finger 106 of the pulley 28 and the rotor assembly 60 can be adjusted to control the rotational speed of the shaft 26 as well as the amount of mechanical drag the pulley 28 places on the engine of the vehicle. In other words, the amount of load the electrically and mechanically driven automotive accessory 20 places on the engine can be controlled in view of the engine's speed, power output, fuel economy, and/or other operating parameters.

The electrically and mechanically driven automotive accessory 20 described above can be controlled according to the method of operation set forth below. The method includes the step of applying electricity to the electrical windings 68 of the stator assembly 58 to generate an electromagnetic field and a primary torque flow path that rotationally drives the rotor assembly 60, and thus, the shaft 26. The method also includes the step of rotationally driving the pulley 28, which is rotatably supported on the pulley bearing assembly 96. The method proceeds with the steps of detecting a first rotational speed of the rotor assembly 60 and/or the shaft 26 and detecting a second rotational speed of the pulley 28. The electrically and mechanically driven automotive accessory 20 may include one or more sensors (not shown) that are configured to measure/read the first rotational speed of the rotor assembly 60 and/or the shaft 26 and the second rotational speed of the pulley 28. The method further includes the step of activating the pulley assist mechanism 30 when the second rotational speed (i.e., the rotational speed of the pulley 28) is greater than the first rotational speed (i.e., the rotational speed of the rotor assembly 60/shaft 26). This step includes applying electricity to the electromagnetic coil 108 to induce a magnetic field in the annular channel 104 in the rotor assembly 60 and eddy currents in the finger 106 of the pulley 28 to create a secondary torque flow path between the pulley 28 and the rotor assembly 60. The step of activating the pulley assist mechanism 30 produces the magnetic loop 128 described above, which extends around the electromagnetic coil 108 in portions of the stator assembly 58, rotor assembly 60, and the finger 106 of the pulley 28. The method may also include the step of deactivating the pulley assist mechanism 30 when the first rotational speed (i.e., the rotational speed of the rotor assembly 60/shaft 26) is greater than the second rotational speed (i.e., the rotational speed of the pulley 28). The steps of activating and deactivating the pulley assist mechanism 30 may be performed by a controller (not shown) adapted to control the output of one or more power supplies (not shown), which may be electrically connected to the windings 126 of the electromagnetic coil 108 and/or the electrical windings 68 of the stator assembly 58.

Figure 6:
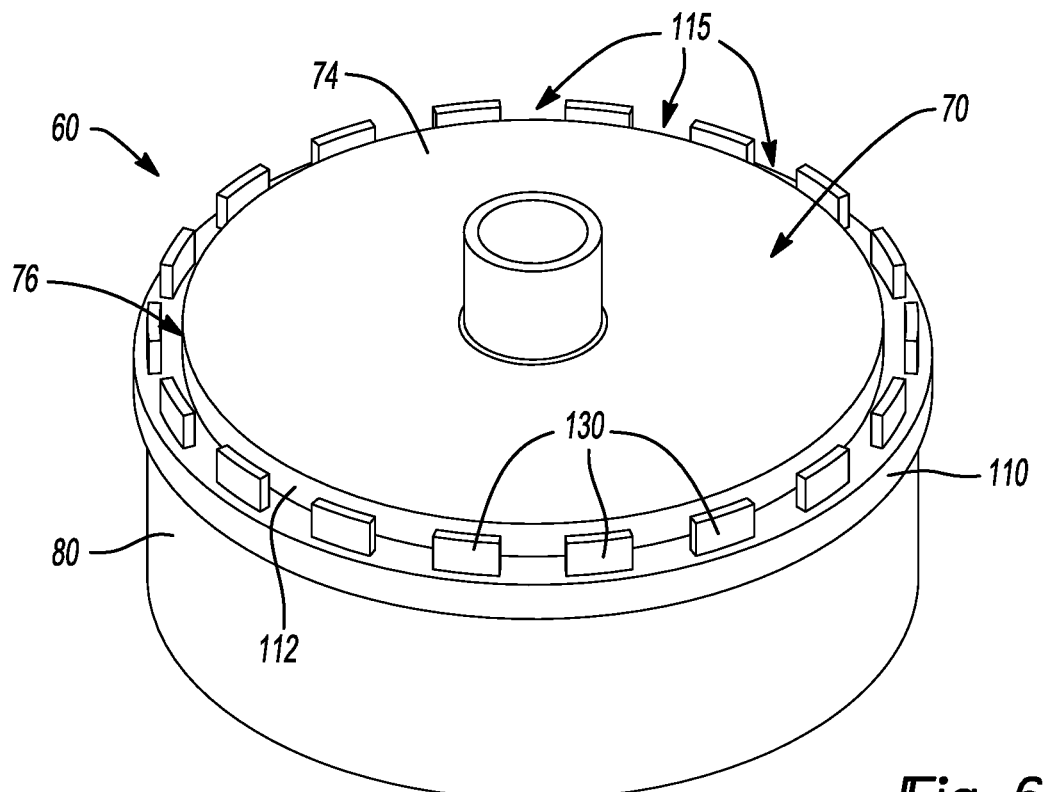
FIG. 6 is a side perspective view of an exemplary rotor assembly of the electrically and mechanically driven automotive accessory illustrated in FIG. 1.

FIG. 6 illustrates the rotor assembly 60 described above. In this view, it can be seen that the rotating backing member 80 is fixedly connected to the hub 70 by the bridge member 110. The notches 115 in the rotating backing member 80 form a plurality of teeth 130 that protrude/extend longitudinally from the bridge member 110. In other words, the teeth 130 are circumferentially spaced apart with the notches 115 that fall between the teeth 130. These teeth 130 are spaced radially outward of the perimeter edge 76 of the hub 70. As a result, the annular channel 104 occupies the space between the teeth 130 and the bent lip 112 of the hub 70.

Figure 7:
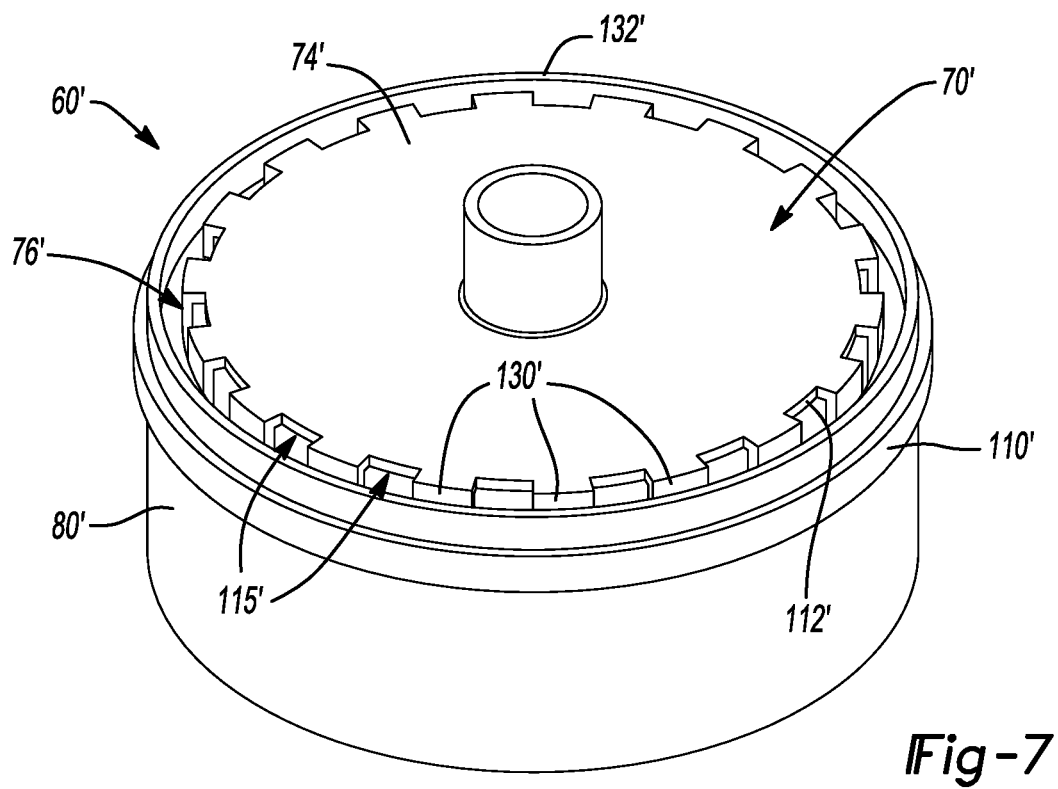
FIG. 7 is a side perspective view of another exemplary rotor assembly of the electrically and mechanically driven automotive accessory illustrated in FIG. 1.

FIG. 7 illustrates an alternative rotor assembly 60' that can be fitted to the electrically and mechanically driven automotive accessory 20 in place of the rotor assembly 60 shown in FIG. 6. The alternative rotor assembly 60' also includes a rotating backing member 80' that is fixedly connected to a hub 70' by a bridge member 110'. The hub 70' includes a perimeter edge 76' and a bent lip 112'. In this embodiment, notches 115' are provided at the perimeter edge 76' of the hub 70' instead of in the rotating backing member 80'. The notches 115' are still positioned circumferentially about the annular channel 104', but this time extend radially inwardly into the bent lip 112' of the hub 70'. The notches 115' form a plurality of teeth 130' on the bent lip 112' of the hub 70' and may or may not extend completely through the bent lip 112' of the hub 70'. The rotating backing member 80' has a proximal end 132', which would face the inboard face 94 of the pulley wall 88 when the electrically and mechanically driven automotive accessory 20 is assembled. In accordance with this embodiment, the proximal end 132' of the rotating backing member 80' protrudes/extends longitudinally from the bridge member 110' and has a cylindrical (i.e., annular ring-like) shape. As a result, the annular channel 104' occupies the space between the teeth 130' and the proximal end 132' of the rotating backing member 80'. In this configuration, the annular channel 104' is bounded on one side by the circumferentially spaced notches 115' in the hub 70'.

Figure 8:
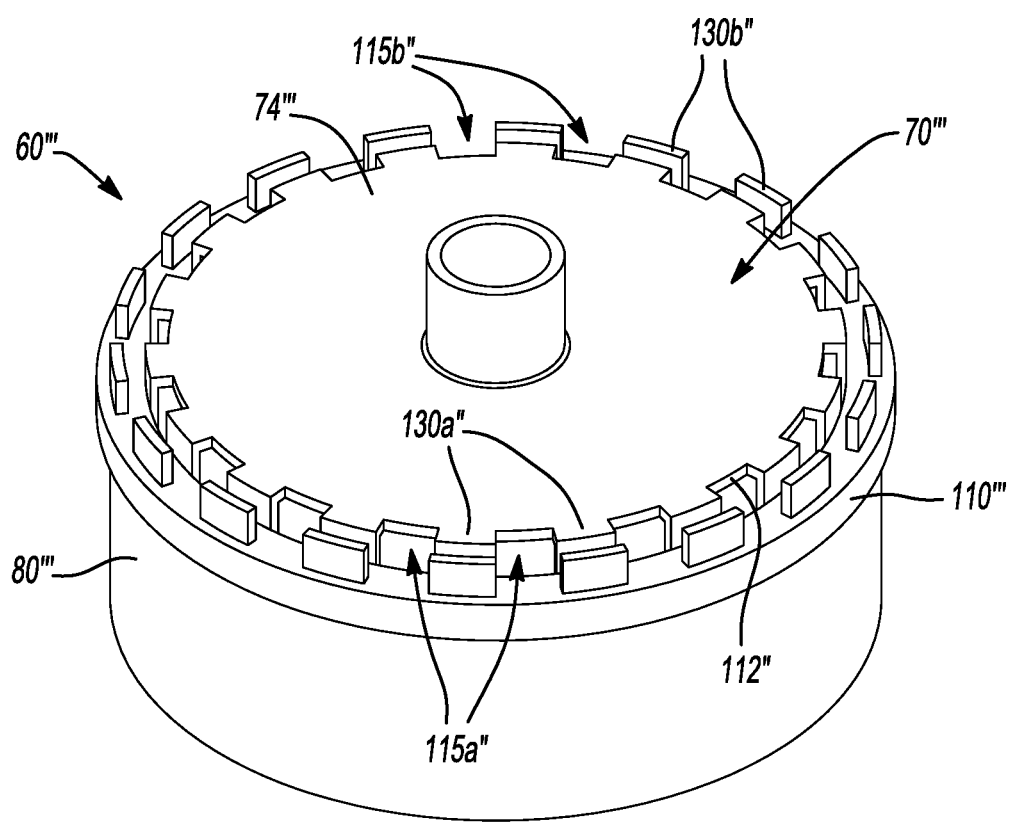
FIG. 8 is a side perspective view of another exemplary rotor assembly of the electrically and mechanically driven automotive accessory illustrated in FIG. 1.

FIG. 8 illustrates another alternative rotor assembly 60" that can be fitted to the electrically and mechanically driven automotive accessory 20 in place of the rotor assembly 60 shown in FIG. 6. This alternative rotor assembly 60" also includes a rotating backing member 80" that is fixedly connected to a hub 70" by a bridge member 110". The hub 70" includes a perimeter edge 76" and a bent lip 112". In this embodiment, a first set of notches 115a" are provided at the perimeter edge 76" of the hub 70" and a second set of notches 115b" in the rotating backing member 80". The first set of notches 115a" extend radially inwardly into the bent lip 112" of the hub 70" and therefore form a first plurality of teeth 130a" on the bent lip 112" of the hub 70". The second set of notches 115b" in the rotating backing member 80" form a second plurality of teeth 130b" that protrude/extend longitudinally from the bridge member 110". These teeth 130b" are spaced radially outward of the perimeter edge 76" of the hub 70". As a result, the annular channel 104" occupies the space between the first plurality of teeth 130a" and the second plurality of teeth 130b", which may or may not be radially aligned. In this configuration, the annular channel 104" is bounded on one side by the first set of circumferentially spaced notches 115a" in the hub 70" and on the other side by the second set of circumferentially spaced notches 115b" in the rotating backing member 80".

Figure 9:
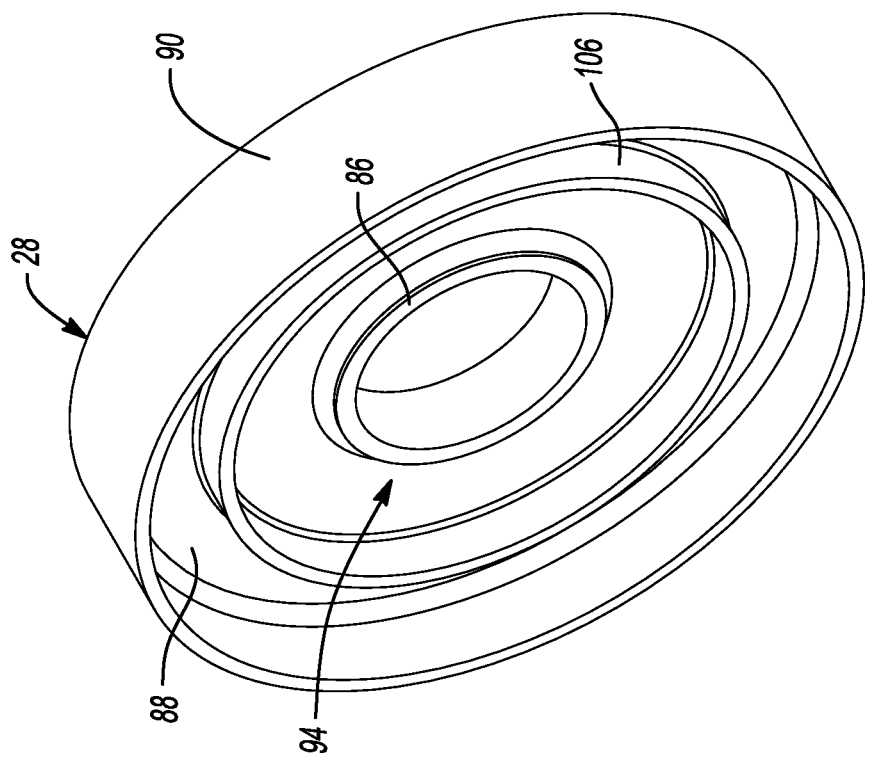
FIG. 9 is a side perspective view of an exemplary pulley of the electrically and mechanically driven automotive accessory illustrated in FIG. 1.

FIG. 9 illustrates the pulley 28 described above. In this view, the hub portion 86, pulley wall 88, and annular rim 90 of the pulley 28 can be seen. The pulley wall 88 extends radially outwardly from the hub portion 86 to the annular rim 90, which is configured to mate with and be rotationally driven by the belt. The finger 106 extends longitudinally from the inboard face 94 of the pulley wall 88 and has a cylindrical (i.e., annular, ring-like) shape.

Figure 10:
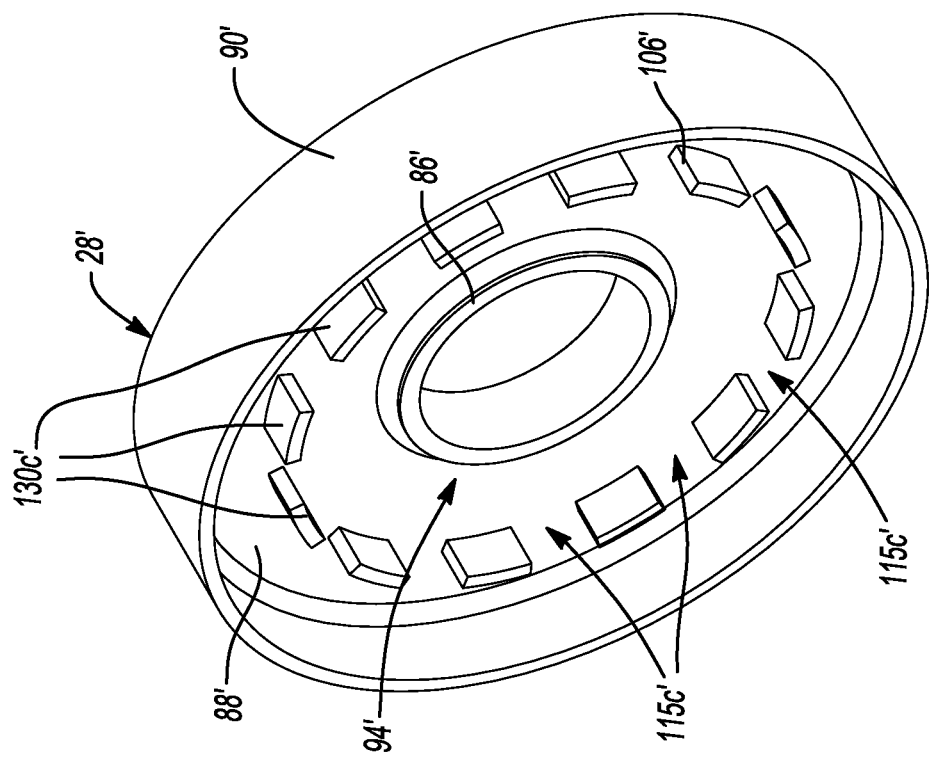
FIG. 10 is a side perspective view of another exemplary pulley of the electrically and mechanically driven automotive accessory illustrated in FIG. 1.

FIG. 10 illustrates an alternative pulley 28' that can be fitted to the electrically and mechanically driven automotive accessory 20 in place of the pulley 28 shown in FIG. 9. The alternative pulley 28' also includes a hub portion 86', a pulley wall 88', and an annular rim 90'. The pulley wall 88' includes an inboard face 94', which would face the hub 70 of the rotor assembly 60 when the electrically and mechanically driven automotive accessory 20 is assembled. Instead of an annular, ring-like finger 106 like that on the pulley 28 shown in FIG. 9, pulley 28' includes a finger 106' that includes a plurality of notches 115c', which may or may not extend completely through the finger 106'. In the illustrated embodiment, the notches 115c' in the finger 106' form a plurality of teeth 130c' that protrude/extend longitudinally from the inboard face 94' of the pulley wall 88'. In other words, the teeth 130c' are circumferentially spaced apart with the notches 115c' that fall between the teeth 130c'. In configurations where the notches 115c' do not extend completely through the finger 106' in the radial direction, the notches may be provided on either one of an inboard or outboard surface of the finger 106', or both.

It should be appreciated that either one of the pulleys 28, 28' can be paired with any one of the rotor assemblies 60, 60', 60" described above. As a result, a number of different combinations are possible. Regardless of the combination, the notches 115, 115', 115a", 115b", 115c' and teeth 130, 130', 130a", 130b", 130c' described herein create interruptions in magnetic flux such that the finger 106, 106' experiences a changing (i.e., fluctuating) magnetic field as it rotates relative to the rotor assemblies 60, 60', 60". This fluctuating magnetic field produces the eddy currents that create the secondary torque flow path between the pulley 28, 28' and the rotor assemblies 60, 60', 60" when the electromagnetic coil 108 is activated (i.e., energized).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. These antecedent recitations should be interpreted to cover any combination in which the inventive novelty exercises its utility. Many modifications and variations of the present invention are possible in light of the above teachings and may be practiced otherwise than as specifically described while within the scope of the appended claims. In addition, the steps of the method set forth herein may be practiced in a different order than that listed herein without departing from the scope of the appended claims.

What is claimed is:

1. An electrically and mechanically driven automotive accessory, comprising:
   a housing;
   a shaft rotatably supported in said housing, said shaft extending along a longitudinal axis between an input end and an output end;
   an electric motor comprising a stator assembly and a rotor assembly that is rotatable relative to said stator assembly, said electric motor being configured to create a primary torque flow path when said electric motor is activated;
   said stator assembly fixedly mounted to said housing;
   said rotor assembly fixedly mounted to said shaft such that said rotor assembly rotates with said shaft;
   a pulley rotatably supported on said input end of said shaft such that said pulley is rotatable relative to said shaft and said rotor assembly; and
   a pulley assist mechanism including an annular channel in said rotor assembly that provides a magnetic gap, a finger made of a non-ferrous metal material that extends from said pulley and is received in said annular channel in a clearance fit, and an electromagnetic coil configured to induce eddy currents in said finger of said pulley and a magnetic field in said magnetic gap to create a secondary torque flow path between said pulley and said rotor assembly when said electromagnetic coil is activated.

2. The electrically and mechanically driven automotive accessory set forth in claim 1, wherein said rotor assembly includes a hub that is fixed to and extends radially outwardly from said shaft to a perimeter edge and a rotating backing member that extends circumferentially about at least a portion of said stator assembly, said rotating backing member being fixedly connected to said hub by a bridge member in an arrangement where said rotating backing member extends annularly about and is spaced radially outward of said perimeter edge of said hub to create said annular channel that receives said finger of said pulley.

3. The electrically and mechanically driven automotive accessory set forth in claim 2, wherein said hub and said rotating backing member are made of ferrous metal materials and said bridge member is made of a non-metallic material to create said magnetic gap in said annular channel.

4. The electrically and mechanically driven automotive accessory set forth in claim 3, further comprising:
   a stationary backing member that is fixedly mounted to said housing and supports said electromagnetic coil of said pulley assist mechanism.

5. The electrically and mechanically driven automotive accessory set forth in claim 4, wherein said stationary backing member is made of a ferrous metal material such that said electromagnetic coil induces a magnetic loop in portions of said hub, said stationary backing member, said rotating backing member, and said finger of said pulley.

6. The electrically and mechanically driven automotive accessory set forth in claim 2, wherein said rotor assembly includes permanent magnets that are fixedly mounted to said rotating backing member and said stator assembly includes stator plates that are fixedly mounted to said housing and that support electrical windings.

7. The electrically and mechanically driven automotive accessory set forth in claim 2, wherein said perimeter edge of said hub has a bent lip, wherein both said bent lip of said hub and said rotating backing member have a plurality of connection holes, and wherein said bridge member is made of an injection molded plastic that extends through said connection holes to form mechanical connections with said bent lip of said hub and said rotating backing member.

8. The electrically and mechanically driven automotive accessory set forth in claim 2, wherein said hub includes a cylindrical portion that receives said input end of said shaft and wherein said pulley is supported by a pulley bearing assembly that is positioned radially between said cylindrical portion of said hub and said pulley.

9. The electrically and mechanically driven automotive accessory set forth in claim 2, wherein at least one of said hub and said rotating backing member includes a plurality of notches that are positioned circumferentially about said annular channel to generate fluctuations in said magnetic field in said finger that create said eddy currents and said secondary torque flow path between said pulley and said rotor assembly when said electromagnetic coil is energized.

10. The electrically and mechanically driven automotive accessory set forth in claim 9, wherein said pulley is supported by a shaft bearing assembly that is positioned radially between said shaft and said tubular portion of said housing.

11. The electrically and mechanically driven automotive accessory set forth in claim 1, wherein said housing includes a tubular portion that receives said shaft and wherein said stator assembly is mounted on said tubular portion of said housing.

12. The electrically and mechanically driven automotive accessory set forth in claim 1, wherein said finger of said pulley includes a plurality of notches that extend at least partially through said finger to generate fluctuations in said magnetic field in said finger that create said eddy currents and said secondary torque flow path between said pulley and said rotor assembly when said electromagnetic coil is energized.

13. The electrically and mechanically driven automotive accessory set forth in claim 1, further comprising:
   an impeller fixedly mounted to said output end of said shaft.

14. An electrically and mechanically driven automotive accessory, comprising:
   a housing;
   a shaft rotatably supported in said housing, said shaft extending along a longitudinal axis between an input end and an output end;
   an electric motor comprising a stator assembly and a rotor assembly that is rotatable relative to said stator assembly, said electric motor being configured to create a primary torque flow path when said electric motor is activated;

said stator assembly fixedly mounted to said housing;

said rotor assembly fixedly mounted to said shaft such that said rotor assembly rotates with said shaft;

a pulley rotatably supported on said input end of said shaft such that said pulley is rotatable relative to said shaft and said rotor assembly; and a pulley assist mechanism including an annular channel in said rotor assembly that provides a magnetic gap that is bounded on at least one side by a plurality of circumferentially spaced notches in said rotor assembly, a finger made of a non-magnetic metal material that extends from said pulley and is received in said annular channel in a clearance fit, and an electromagnetic coil configured to induce eddy currents in said finger of said pulley and a magnetic field in said magnetic gap to create a secondary torque flow path between said pulley and said rotor assembly when said electromagnetic coil is activated.

15. The electrically and mechanically driven automotive accessory set forth in claim 14, wherein said rotor assembly includes a hub that is fixed to and extends radially outwardly from said shaft to a perimeter edge and a rotating backing member that extends circumferentially about at least a portion of said stator assembly, said rotating backing member being fixedly connected to said hub by a bridge member in an arrangement where said rotating backing member extends annularly about and is spaced radially outward of said perimeter edge of said hub to create said annular channel that receives said finger of said pulley.

16. The electrically and mechanically driven automotive accessory set forth in claim 15, further comprising:

a stationary backing member that is fixedly mounted to said housing and supports said electromagnetic coil of said pulley assist mechanism, wherein said stationary backing member is made of a magnetic material such that said electromagnetic coil induces a magnetic loop in portions of said hub, said stationary backing member, said rotating backing member, and said finger of said pulley.

17. The electrically and mechanically driven automotive accessory set forth in claim 15, wherein said plurality of notches are provided in at least one of said hub and said rotating backing member.

18. The electrically and mechanically driven automotive accessory set forth in claim 14, wherein said finger of said pulley includes a plurality of notches that extend at least partially through said finger to generate fluctuations in said magnetic field in said finger that create said eddy currents and said secondary torque flow path between said pulley and said rotor assembly when said electromagnetic coil is energized.

19. A method of operating an electrically and mechanically driven automotive accessory, comprising the steps of:

applying electricity to electrical windings of a stator assembly to generate an electromagnetic field and a primary torque flow path that rotationally drives a rotor assembly and a shaft fixedly connected to the rotor assembly;

rotationally driving a pulley that is rotatably supported on a pulley bearing assembly;

detecting a first rotational speed of at least one of the rotor assembly or the shaft;

detecting a second rotational speed of the pulley; and activating a pulley assist mechanism when the second rotational speed is greater than the first rotational speed, wherein said step of activating the pulley assist mechanism includes applying electricity to an electromagnetic coil to induce a magnetic field in an annular channel in the rotor assembly and eddy currents in a finger that extends from the pulley and is received in the annular channel to create a secondary torque flow path between the pulley and the rotor assembly.

20. The method set forth in claim 19, wherein said step of activating a pulley assist mechanism produces a magnetic loop surrounding the electromagnetic coil in portions of the stator assembly, the rotor assembly, and the finger of the pulley.

* * * * *